(12) United States Patent
Spicer et al.

(10) Patent No.: US 8,747,765 B2
(45) Date of Patent: Jun. 10, 2014

(54) APPARATUS AND METHODS FOR UTILIZING HEAT EXCHANGER TUBES

(75) Inventors: David B. Spicer, Houston, TX (US); Jeffrey P. Jones, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 682 days.

(21) Appl. No.: 12/762,910

(22) Filed: Apr. 19, 2010

(65) Prior Publication Data

US 2011/0257455 A1    Oct. 20, 2011

(51) Int. Cl.
  *C10G 9/20*    (2006.01)
  *B01J 19/00*   (2006.01)
  *F28D 7/00*    (2006.01)

(52) U.S. Cl.
  USPC .......... 422/198; 422/240; 422/310; 422/650; 196/110; 196/116; 208/132

(58) Field of Classification Search
  None
  See application file for complete search history.

(56) References Cited

U.S. PATENT DOCUMENTS

| | | | |
|---|---|---|---|
| 1,949,109 A * | 2/1934 | Pier et al. .................... | 208/400 |
| 2,362,107 A * | 11/1944 | Wallis et al. ................ | 122/356 |
| 2,937,923 A | 5/1960 | Shapleigh | |
| 3,600,141 A * | 8/1971 | Mevenkamp et al. ........ | 422/202 |
| 3,607,130 A * | 9/1971 | Worley et al. ................ | 422/625 |
| 4,297,150 A * | 10/1981 | Foster et al. ................. | 148/276 |
| 4,315,486 A | 2/1982 | Seeman et al. | |
| 4,499,055 A | 2/1985 | DiNicolantonio et al. | |
| 5,206,880 A | 4/1993 | Olsson | |
| 5,591,415 A | 1/1997 | Dassel et al. | |
| 6,093,260 A | 7/2000 | Petrone et al. | |
| 6,337,459 B1 | 1/2002 | Terwijn et al. | |
| 6,419,885 B1 | 7/2002 | DiNicolantonio et al. | |
| 6,436,202 B1 | 8/2002 | Benum et al. | |
| 6,824,883 B1 | 11/2004 | Benum et al. | |
| 6,899,966 B2 | 5/2005 | Benum et al. | |
| 7,056,399 B2 | 6/2006 | Cai et al. | |
| 7,156,979 B2 | 1/2007 | Benum et al. | |
| 7,488,392 B2 | 2/2009 | Benum et al. | |
| 2004/0147794 A1 | 7/2004 | Brown et al. | |
| 2005/0287053 A1 | 12/2005 | Sakai et al. | |

FOREIGN PATENT DOCUMENTS

| | | |
|---|---|---|
| DE | 200 01 820 | 6/2000 |
| EP | 0 962 422 | 12/1999 |
| WO | WO 98/19537 | 5/1998 |
| WO | WO 98/19540 | 5/1998 |

* cited by examiner

*Primary Examiner* — Jennifer A Leung

(57) ABSTRACT

In one aspect, the present techniques include a heat exchange apparatus including: a) a body comprising an interior cavity, the body including: a first surface and a second surface defining at least a portion of the body and the first surface positioned exterior with respect to the second surface and the interior cavity, and the second surface positioned exterior with respect to the interior cavity and interior with respect to the first surface; b) a first conduit for conveying a fluid to the body; c) a second conduit in fluid communication with the first conduit wherein the second conduit is positioned at least partially within the interior cavity of the body; and d) a joint between the first conduit and the second conduit, wherein the joint moves between a first location and a second location based on the temperature within the interior cavity, wherein at least one of said first location and said second location is positioned intermediate the first surface and the second surface.

24 Claims, 2 Drawing Sheets

APPARATUS AND METHODS FOR UTILIZING HEAT EXCHANGER TUBES

FIELD OF THE INVENTION

The present application pertains to a heat exchange apparatus, such as may be useful in direct fired thermal, heat exchange with (to or from) a fluid conveyed through a tubular arrangement within the apparatus body, wherein the body includes another heat exchange medium, heat source, or sink. In one exemplary application, the present technique pertains to an apparatus for conveying within a tubular system a fluid to be heated, whereby such tubes convey the fluid from one temperature system, such as outside of the apparatus, into a relatively different (e.g., higher) temperature portion of the apparatus, such as into a firebox region, to heat the fluid. In another exemplary embodiment, the present technique pertains to hydrocarbon cracking furnaces.

BACKGROUND OF THE INVENTION

In a heat exchange apparatus, tubes are in fluid communication with each other and used to convey a fluid through an apparatus for purposes of either heating or cooling the conveyed fluid. In certain applications, it may be desirable to join one or more tubes positioned in a relatively extreme thermal region of the apparatus to one or more tubes in a relatively less extreme thermal region either within or external to the apparatus, such that thermal expansion and/or contraction may move or impose relatively severe stresses upon, the joint between the tubes. For example, in a hydrocarbon steam cracking furnace, tubes are arranged to pass a feed from outside a firebox, into and through the firebox, and then out of the firebox to a quench system. Due to the temperature differentials involved in the process and potentially the internal pressure of the feed within the tubes, the tubes experience thermal expansion and thermal stresses. Accordingly, the tubes are arranged to minimize the thermal stresses wherever possible. The joint connecting the tubes may be particularly vulnerable to stresses. As such, it may be challenging to sustain desired performance properties. Special precautions, with respect to joint integrity, strength, and/or protection against inadvertent ruptures or leaks may be required. Such tubular connections or joints may also involve a special connection apparatus, such as a special union fitting, or include redundant connection mechanisms such as threads and welds. Where a leak may be particularly hazardous, such as posing a risk of fire or toxic release, it may be desirable to position the joint within the confines of the apparatus casing so that any potential leak may be consumed, oxidized, or pyrolyzed within the high heat zone (e.g., firebox or radiant heating section).

One exemplary heat exchange apparatus is a hydrocarbon steam cracking furnace. Steam-cracking pyrolysis is the predominant process used in the production of ethylene and propylene. Steam cracking is typically conducted in a direct-fired tubular reactor. Volatile hydrocarbon feeds, such as ethane, naphthas, gas-oils, and crude fractions, are heated rapidly in the presence of steam to produce ethylene, propylene, and other product species. The steam cracking process typically involves conveying a feed fluid from a lower temperature region (outside the furnace) into and through a high temperature region (inside the furnace), and then out of the high temperature region into another lower temperature region (outside the furnace).

One of the process variables in this process is reactor residence time. For example, a greater portion of the hydrocarbon feed is converted to ethylene and propylene if the reaction time in the radiant coil (e.g., tube, tubes, or tubulars) is kept as short as possible. The industry-standard measure of residence time is the time required to pass through the tube in the radiant firebox and the exit tube to the quench unit. One common approach to reducing residence time is by using high strength steel that can tolerate higher heat fluxes, thus enabling use of reduced coil length and surface area. Exemplary materials include wrought or cast high-alloy austenitic stainless steels. Another common approach is to use furnace coil designs of shorter and shorter lengths. To avoid exceeding the radiant tube heat flux and/or temperature limits, as the coil length is reduced, a larger number of smaller diameter coils are used in parallel because smaller diameter coils have a larger surface area-to-volume ratio than larger diameter tubes.

Metallurgical-related limitations are impediments to still further reductions in furnace residence times. Austenitic steels commonly used for the radiant coil and unfired adiabatic zone of ethylene furnaces have reasonable high temperature strength up to 1100-1150° C. and are weldable, using well-proven techniques. However, the austenitic steels have the disadvantage that the interior surface of the tubes and fittings catalyzes carbon deposits (e.g., coke). As this coke layer grows, it insulates the process gas, which results in tube wall temperature increases to provide sufficient heat for the reaction to proceed. Eventually, the tube wall temperature limit is reached and the furnace is taken out of service for decoking. Thus, while a given material may be capable of operating at temperatures, for example, of up to 1100° C., the furnace design is limited to a "clean-coil" tube wall temperature of about 1020° C. to allow for the temperature rise. This limitation constrains both how short a residence time may be designed in a coil and how much feed can be processed in a coil of a given geometry.

While there are other contributors to coke formation, tube surface catalyzed coking is generally accepted as a predominant cause of coke formation, particularly for light gas feeds such as ethane. Surface catalyzed coking rates increase as surface temperature increases. Thus, the temperature limits of austenitic stainless steel radiant tube materials and the coke that forms, at least in part, due to the catalytic reactions that take place at the tube surface effectively combine to prevent designers from reducing residence times below approximately 0.10 seconds. This also sets a limitation on the maximum ethylene yield that can be achieved from a furnace.

If the coking phenomena could be eliminated or substantially reduced, furnaces could be designed for higher "start-of-run" or "clean wall" tube metal temperatures, thus permitting shorter reaction times and thus higher product yields, and may also permit a higher feed rate to be processed through a given radiant coil design. Such an improvement may be realized by using radiant tubes manufactured from a material whose inner surface does not catalyze coke. In addition, if radiant tube materials are used which operate at higher temperatures than the current austenitic stainless steels, then coil length and residence time, may be reduced even more, leading to even further increases in ethylene yield.

To reduce the formation of coke, ceramic tubes, which resist formation of surface-catalyzed coke, may be utilized. However, ceramic materials and some metals that form alumina rather than chromia oxide layers have extremely low ductility and are brittle and, thus are susceptible to cracks and leaking. Further, they do not tolerate extreme rapid cooling without a tendency to crack or shatter. As such, use of these materials has only been acceptable inside the radiant firebox of the furnace where any leak is contained and oxidized within the refractory lined casing plate. Such use is unacceptable outside the casing plate of the radiant section of the furnace. Any leak outside the radiant section (either radiant inlet or outlet) could immediately result in a fire as the hydrocarbon material is above its auto-ignition temperature at these locations. Therefore, the radiant inlets and radiant outlets located outside the radiant firebox are constructed of more ductile materials such as the existing high-alloy austenitic stainless steels to minimize leakage and fire risks.

Joining low coke catalyzing radiant coils to the austenitic inlets and outlets is a major challenge. Welding alumina formers to austenitic stainless steels, while possible, often results in a weld joint of significantly reduced high-temperature stress-rupture strength than the strength of austenitic materials. Such joints may not have sufficient strength to tolerate the high temperatures experienced inside radiant sections of pyrolysis furnaces. For this reason, such joints may use a complex threaded joint for mechanical strength with a seal weld for gas tightness. Joining ceramics to austenitic stainless steels also poses great engineering challenges due to the significantly different co-efficients of thermal expansion. This leads again to the use of complex mechanical joints or low strength brazing techniques that are not well suited for the high temperatures of a radiant section.

In one aspect, what is needed is a heat exchange apparatus that facilitates maintaining sensitive tubular joint connections within the high heat zone casing of the apparatus, while also protecting the connection from any high or extreme temperature that may be encountered at operating conditions that may compromise such connection joint.

What is also needed is a hydrocarbon steam cracking furnace that incorporates radiant tubes made of materials that do not catalyze coke formation securely and safely joined to austenitic stainless steel inlet and/or outlet sections outside the radiant firebox.

SUMMARY OF THE INVENTION

One or more of the embodiments of present techniques pertain to a heat exchange apparatus, such as may be useful in direct fired thermal, heat exchange to or from a fluid conveyed through a tubular arrangement, or other relatively high temperature applications. In one exemplary application, the present techniques pertain to apparatus for conveying within a tubular system, a fluid to be heated, whereby such tubes convey the fluid from one temperature system, such as outside of the apparatus or from a lower heat zone of the apparatus, into a relatively higher temperature portion of the apparatus, such as into a firebox region, to heat the fluid. In another exemplary embodiment, the present techniques pertain to steam cracking furnaces. In another exemplary application, the present techniques pertain to methods for joining a portion of the tube system without exposing critical tubular joints to both the heat of the high temperature region and to an environment where a leak may create an undesirable risk or which otherwise does not tolerate the presence of the connection therein.

In one example, the present techniques relate to methods and equipment pertaining to joining radiant tubes having low propensity for catalyzing coke formation in such tubes to austenitic stainless steel components. In other non-limiting examples, the present techniques include methods and equipment for connecting such radiant section tubes with other related tubes.

In another aspect, the present techniques relate to steam cracking equipment and methods for preparing the same, including but not limited to steam cracking furnaces, steam cracking radiant section apparatus, radiant cracking coils, radiant coil connection apparatus, and/or related equipment, and methods for preparing and/or using the same. In other aspects, the present techniques include equipment and methods for joining radiant coil components having low propensity for catalyzing inner-surface coke formation with austenitic stainless steel components.

In still other aspects, the present techniques comprise a steam-cracking furnace, such as may be useful for the production of olefins, in which the radiant coil is manufactured from a material having an inside surface that does not catalyze coke formation that is joined with a high strength steel tube and/or tube components. Coke-resistant tube materials may include various ceramics and/or metallics. Exemplary metallics may include but are not limited to metallics that do not form iron oxides, nickel oxides, or mixed oxides containing iron or nickel oxides on their inner surfaces. It is anticipated that such materials may preferably form either a stable $Al_2O_3$ or a stable $SiO_2$ layer on the coil inside surface under steam cracking conditions.

In other embodiments, the present techniques include positioning the connection(s) joining the coke-resistant (e.g., $Al_2O_3$ or $SiO_2$-forming) radiant coil material with the austenitic stainless steel inlet or outlet sections are located inside the confines of the radiant firebox casing but outside the exposed radiant firebox when the coil is at operating temperatures.

In still other aspects, the present techniques may include a heat exchange apparatus comprising: heat exchange apparatus comprising: a) a body forming an interior cavity, said body including: a first surface and a second surface defining at least a portion of said body, wherein said first surface is positioned exterior with respect to interior cavity and with respect to said second surface, and said second surface positioned between said interior cavity and said first surface; b) a first conduit for conveying a fluid to said body; c) a second conduit in fluid communication with said first conduit wherein said second conduit is positioned at least partially within said interior cavity of said body; and d) a joint between said first conduit and said second conduit, wherein said joint moves between a first location and a second location based on the temperature within the interior cavity, wherein at least one of the first location and the second location is intermediate said first surface and said second surface. Other aspects of the present techniques may include a heat exchange apparatus wherein the first conduit comprises austenitic stainless steel; and the second conduit comprises a metallic or ceramic material that does not catalyze formation of coke; wherein the joint is positioned intermediate the first surface and the second surface when the second conduit is at a tube metal temperature of at least 700° C., or at least 900° C., or at least 1000° C., or at least 1020° C. In some other embodiments, the first surface may be a first wall, while the second surface may be a second wall. Further, the first wall and second wall may be formed from materials that are similar materials or each may be formed from materials that are different.

In yet other aspects, the present techniques may include a hydrocarbon cracking unit comprising: a) a furnace having an interior cavity formed by a furnace casing and firebox wall, wherein said furnace casing is exterior with respect to said interior cavity, said firebox wall positioned between said furnace casing and interior cavity; b) a first conduit comprising austenitic stainless steel; c) a second conduit comprising an inner surface, said second conduit positioned at least partially within said interior cavity; and d) a joint between said first conduit and said second conduit, wherein said joint moves between a first location and a second location based on the temperature within the interior cavity, wherein at least one of said first location and said second location is intermediate said furnace casing and said firebox wall. In some embodiments, the joint is located intermediate the firebox wall and the furnace casing when the second conduit is at a tube metal temperature of at least 700° C.

DETAILED DESCRIPTION

Figure 1:
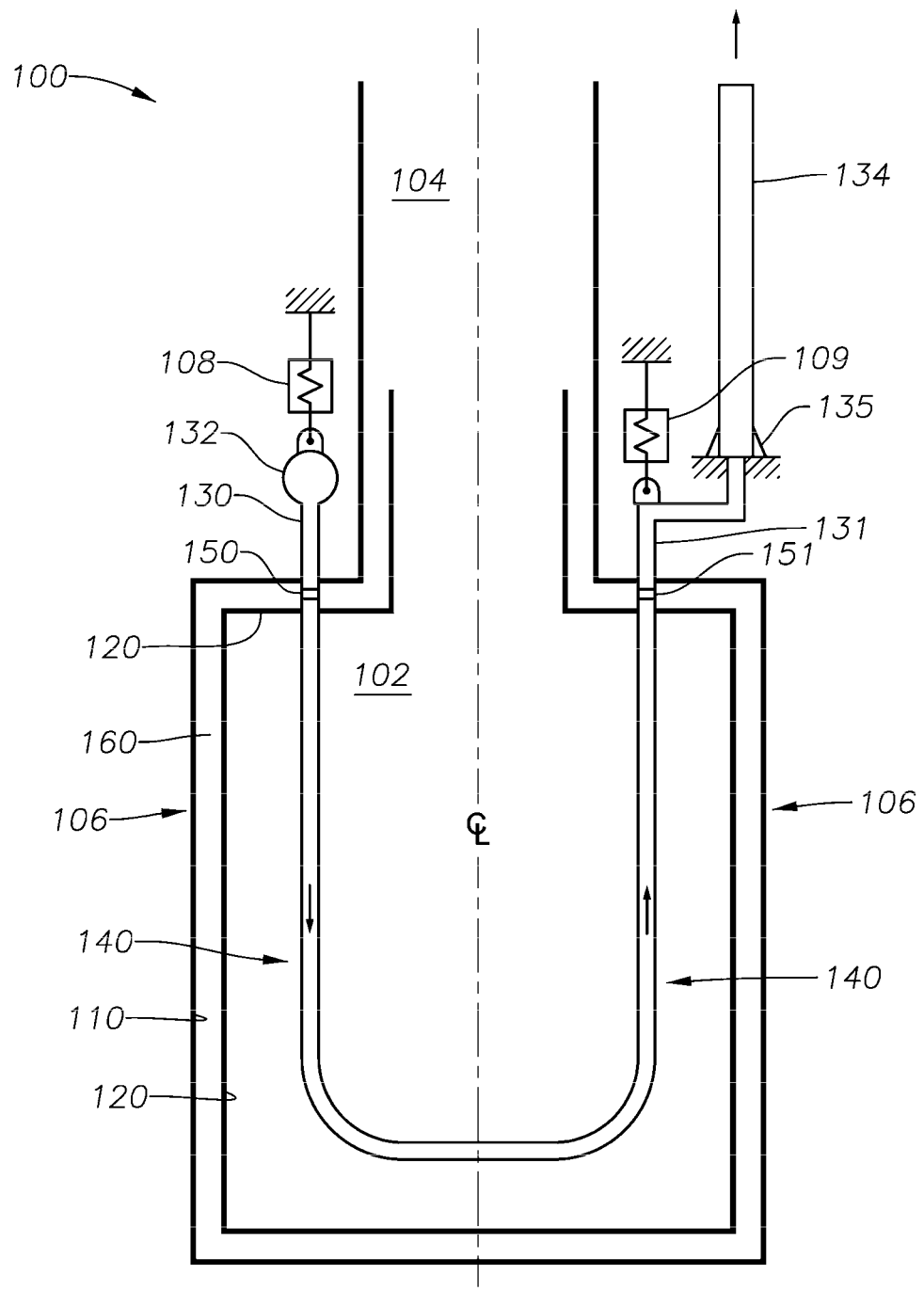
FIG. 1 illustrates a simplified exemplary embodiment of a furnace employing a "U-shaped" coil in accordance with the present techniques.

In a heat exchange apparatus, it may be desirable to join one or more fluid conducting tubes that are located in the hottest regions of the apparatus to one or more tubes located in relatively lower temperature regions of the apparatus. Both tubes are used to convey a fluid through the apparatus for purposes of either heating or cooling the conveyed fluid. The joint connecting the tubes may be particularly critical or worthy of special precautions with respect to joint strength and/or protecting against inadvertent leaks from the joint. Such joints may involve a special connection apparatus, such as a special union fitting, or include redundant connection mechanisms, such as both threads and welds. In many instances where a leak may be particularly hazardous, such as posing a risk of fire or toxicity, it may be desirable to position the joint within the confines of the apparatus casing so that any potential leak may be consumed, oxidized, or pyrolyzed within the high heat zone (e.g., firebox). Due to thermal expansion, the position of the joint at both ambient conditions and at operating conditions are considered.

The apparatus and processes in an embodiment of the present techniques may have particular utility in a variety of heat exchange apparatus, including but not limited to heat exchangers, furnaces, pyrolysis reactors, catalytic reactors, boilers, direct fired heaters, and other refractory applications. In many such applications, the fluid in the tube is heated by the exchanger apparatus. The apparatus and processes may also have utility with regard to cooling processes, such as but not limited to cryogenic apparatus or other heat exchangers whereby the fluid within the tube is cooled, which are discussed further below. In such applications, it may still be desirable to confine one or more tubular connections within an apparatus casing while still protecting the apparatus from direct exposure to the cold or relatively cooler apparatus environment temperature. The present techniques include and are applicable to both heating and cooling types of tubular heat exchange applications.

One exemplary heat exchange apparatus used for heating the fluid within the tubes is a hydrocarbon steam cracking furnace. Steam-cracking pyrolysis is the predominant process used in the production of ethylene and propylene in industry. Steam cracking is typically conducted in a direct-fired tubular reactor. Volatile hydrocarbon feeds, such as ethane, naphthas, gas-oils, and crude fractions are heated rapidly in the presence of steam to produce ethylene, propylene, and other product species. One of the process variables in this process is residence time. A greater portion of the hydrocarbon feed is converted to ethylene and propylene if radiant coil reaction time is as short as possible. One approach to reducing residence time is by using high strength steel that can tolerate higher heat fluxes, thus enabling use of reduced coil length and surface area. Exemplary materials include but are not limited to wrought or cast high-alloy austenitic stainless steels.

Another common approach is to use furnace coil (tube) designs of shorter lengths. To avoid exceeding the radiant tube heat flux and temperature limits, as coil length is reduced, a larger number of smaller diameter coils are used in parallel (smaller diameter coils have a larger surface area-to-volume ratio than larger diameter tubes). Pyrolysis furnace radiant coils in the industry are commonly 50-70 feet (15.24-21.34 m) in length, with inside diameters as low as 1.75-2.25 in (4.45-5.72 cm), providing residence times of approximately 0.20 seconds. Coils of this type typically make two passes through the radiant firebox. It is common, but not essential, for such a coil to be arranged in a "U-shape," which is discussed further in FIG. 1 with regard to an embodiment of the present techniques. The highest selectivity coils in commercial use employ radiant coils approximately 35-45 feet (10.67-13.72 m) in length, with inside diameters in the range 1.25-1.75 in (3.18-4.45 cm). Such designs have achieved residence times as low as 0.10-0.15 seconds. Such coils are commonly referred to as "single-pass" coils as they make one single pass through the radiant heating/reaction section of the pyrolysis furnace, which is discussed further in FIG. 2 with regard to an embodiment of the present techniques. Another common approach for reducing residence time is using coils with extended heat transfer surfaces on the interior of the tubes. By increasing the effective heat transfer surface area per foot of tube length, the same furnace heat transfer duty can be accomplished in a shorter coil while staying within the temperature limitations of the radiant tube materials. By combining extended interior heat transfer tubes with "single-pass" radiant coil designs enables residence times as low as 0.08-0.11 seconds.

Metallurgical-related limitations are impediments to still further reductions in furnace residence times. Austenitic steels commonly used for the radiant coil and unfired adiabatic zone of ethylene furnaces have reasonable high temperature strength up to 1100-1150° C. and are weldable, using well-proven techniques. However, the Austenitic steels have the disadvantage that the interior surface of the tubes and fittings catalyzes the production of carbon deposits (coke). As this coke layer grows, it insulates the process gas, which results in tube wall temperature increases to provide sufficient heat for the reaction to proceed. Eventually the tube wall temperature limit is reached and the furnace is taken out of service for decoking. Thus, while a given material may be capable of operating at temperatures, for example, of up to 1100° C., the furnace design is limited to a "clean-coil" tube wall temperature of maybe 1020° C. to allow for the temperature rise. This limitation constrains both how short a residence time may be designed in a coil and how much feed can be processed in a coil of a given geometry. The terms "coil", "tubular", "conduit" and "tube" may be used interchangeably herein.

While there are other contributors to coke formation, tube surface catalyzed coking is generally accepted as a predominant cause of coke formation, especially when cracking lighter gas feeds such as ethane. Surface catalyzed coking rates increase as surface temperature increases. Thus, the temperature limits of austenitic stainless steel radiant tube materials and the coke that forms, at least in part, due to the catalytic reactions that take place at the tube surface effectively combine to prevent designers from reducing residence times below approximately 0.10 seconds. This also sets a limitation on the maximum ethylene yield that can be achieved from a furnace.

If the coking phenomena is eliminated or substantially reduced, furnaces may be designed for higher "start-of-run" or "clean wall" tube metal temperatures, thus permitting shorter reaction times and thus higher product yields, or also permitting a higher feed rate to be processed through a given radiant coil design. Such an improvement could be realized by using radiant tubes manufactured from a material whose inner surface does not catalyze coke. If, in addition, radiant tube materials were used which could operate at higher temperatures than the current austenitic stainless steels, then coil length, and residence time, could be reduced even more, leading to even further increases in ethylene yield.

Also, another feature relating to the design and operation of steam cracking furnaces is the use of dilution steam. Feed is combined with dilution steam prior to the mixture entering the radiant, or reaction, coil of the furnace. Depending on the feedstock being processed, dilution steam may be used at a weight ratio of 0.2-1.0 based on the radiant feed rate. Dilution steam serves at least the following three purposes in steam cracking: 1) reduces the hydrocarbon partial pressure in the reaction coil and desirably increases selectivity to light olefins; 2) reduces rate of coking due to thermal cracking temperatures, which is a coking mechanism that is distinct from coke formation catalyzed by the surface of the furnace coil; and 3) the steam generates a small oxygen partial pressure in the radiant coil, that in turn assists the austenitic stainless steel materials from which the coil is manufactured to maintain a chromium oxide ($Cr_2O_3$) layer on the inside of the tube and thus minimizes the rate of carbon diffusion into the tube materials (carburization) and also minimizes the rate of surface catalyzed coke formation. Unfortunately, high dilution steam ratios carry with them increased energy costs and increased equipment sizing and water handling equipment. The limit to how low a dilution steam ratio can successfully be operated is generally associated with the factors of increasing coking rate and the increasing difficulty maintaining a tube inside surface $Cr_2O_3$ layer.

Materials with low catalytic coking propensity generally fall into one of two categories: 1) alumina formers and 2) silica formers and ceramics. These materials have low surface catalyzed coking tendencies due their ability to form a stable $Al_2O_3$ or $SiO_2$ layers on the coil inside surface. Such layers are relatively inert to catalytic coking and also provide resistance to carburization. Further, $Al_2O_3$ layers remain stable to lower oxygen partial pressures than $Cr_2O_3$ layers, thus enabling use of lower dilution steam ratios. Ceramic (quartz) tubes are also known from experiments to resist formation of surface-catalyzed coke. In particular, alumina formers or silica formers may be used over an austenitic stainless steel tube to reduce surface catalyzed coking in the tube, or to reduce tube oxidation, which are high temperature phenomena. In a cold/cryogenic application, a stainless steel tube in the heat exchanger may be used with a conventional stainless steel to stainless steel weld.

However, ceramic materials and some alumina formers have very low ductility and are brittle, thus being relatively susceptible to cracks and leading. Further, these materials do not tolerate extremely rapid cooling without a tendency to crack or shatter, so use of these materials is only acceptable inside the radiant firebox of the furnace where any leak is contained and oxidized within the refractory lined casing plate. That is, use is unacceptable outside the casing plate of the radiant section of the furnace because of potential leaks. For example, a leak outside the radiant section (either radiant inlet or outlet) could result in a fire, as the hydrocarbon material is above its auto-ignition temperature at these locations. Therefore, the radiant inlets and radiant outlets located outside the radiant firebox should be constructed of more ductile materials, such as the existing high-alloy austenitic stainless steels, to minimize leakage and fire risks.

Joining high strength or low coke catalyzing radiant coils to the austenitic inlets and outlets then becomes a challenge. Welding alumina formers to austenitic stainless steels, while possible, often results in a weld joint of significantly reduced high-temperature stress-rupture strength than the strength of austenitic materials. Such joints may not have sufficient strength to tolerate the high temperatures experienced inside radiant sections of pyrolysis furnaces. For this reason such joints may use a complex threaded joint for mechanical strength with a seal weld for gas tightness. The term "joint" is used synonymously with the term "connection," as pertaining to directly connecting the flow paths of two tubular components (e.g., conduits or tubes) with each other into a common flow path, although such joint may actually include particular joining apparatus, combinations of connections, multiple connections proximately related to each other at or near the two joined tubulars. The joint may include connecting apparatus, gasket, splices, fittings, flanges, weld material, threads, couplings, crimps, bushings, collars, connector-subs, reducers, insulation apparatus, and/or other components affiliated with the connection and transition from an external conduit (e.g., an inlet conduit or an outlet tube, which may be referred to as a first conduit) to a internal conduit (e.g., furnace tube, which may be referred to as a second conduit). The external conduit may comprise substantially the same or different materials as the internal conduit. The joint may also include two or more separate joints, such as when connecting a generally "U-shaped" furnace conduit (e.g., a U-shaped radiant tube within a steam cracking furnace) to an inlet conduit and an outlet conduit. In such instance, the inlet conduit may or may not comprise the same materials as the outlet conduit, which may also include a different material than the furnace conduit. Joining ceramic or ceramic lined tubulars to austenitic stainless steels is an engineering challenge due to the significantly different co-efficients of thermal expansion. This may lead again to the use of complex mechanical joints and/or low strength brazing techniques that are not well suited for the high temperatures of a radiant section.

Certain embodiments of the present techniques may include a steam-cracking furnace for the production of ethylene in which: (a) the radiant coil is manufactured from a material or a material having and inside surface does not catalyze the formation of coke, (such materials may be ceramic or metallic, but they do not form iron oxides, nickel oxides, or mixed oxides containing iron or nickel oxides on their inner surfaces. It is anticipated that such materials form either a stable $Al_2O_3$ or a stable $SiO_2$ layer on the coil inside surface under steam cracking conditions); and (b) the joints between the $Al_2O_3$ or $SiO_2$ forming radiant coil material and the austenitic stainless steel inlet and outlet sections are located inside the confines of the radiant firebox casing, but are outside the radiant-heat-exposed region of the firebox when the metal temperature of the coil is at operating temperatures, which may include temperatures up to 900° C. (1652° F.) or even 1200° C. (2192° F.) with the flue-gas temperature being higher.

While a furnace employing the principles above may theoretically have a serpentine coil, the concept is particularly well suited to a furnace employing a single-pass radiant coil or a "U-shaped" coil, which are discussed further below. A furnace employing the principles above may employ tubes with a conventional circular internal profile, or the furnace may employ an extended internal profile to enhance heat transfer. Further, a furnace employing the principles above may employ tubes with a "finned" or non-circular, internal or external profile. In the case of the "U-shaped" coil, both the joints, whether the joints include similar or dissimilar materials, may be positioned inside the firebox, or the firebox roof (arch) casing extremity, (e.g., the primary exterior wall or structure of a furnace, commonly known in the steam cracking art as the furnace casing, may be defined herein for reference purposes as a first wall) but may be shielded from direct radiation from the firebox by the interior or second wall, (e.g., an arch insulation system, which defines at least a portion of the second wall. Typically such insulation systems are 12-14 in (30.48-35.56 cm) thick).

The radiant coil is typically supported/anchored on the outlet leg, shortly after exiting the firebox. This support may be provided by the quench exchanger located immediately downstream of the radiant firebox, for example. Because the outlet leg of the coil expands more than the inlet leg, the dissimilar material joint on the inlet leg moves down as the coil heats up to operating conditions. The joint location may be designed so that even with this downward movement, the joint is still protected from direct radiation when the coil is in the operating condition.

In the case of the single-pass (up-flow) coil, the dissimilar material joint at the radiant coil outlet may also be located within the arch insulation, similar to the "U-shaped" coil case. However, the dissimilar material joint at the radiant coil inlet is located in the general region of the furnace floor. A single-pass coil supported/anchored near the radiant outlet is typically in the region of 30-40 ft (9.14-12.19 m) long, and expands in the range of 8-10 in (20.32-25.4 cm) when heating up from ambient to operating temperatures. Therefore, the dissimilar material joint is located approximately 4-6 in (10.16-15.24 cm) above the top of the floor insulation (also typically 12-14 in (30.48-35.56 cm) thick) when the furnace is at ambient temperature. In this manner, as the furnace heats up to operating temperature, the dissimilar material joint grows downward and is protected from direct radiation as it enters the floor insulation region. A designer experienced in the art is able to select the required ambient-temperature position for the joints with his/her knowledge of the operating temperature of the specific radiant coil under consideration, and the thermal expansion co-efficient of the specific radiant tube material being used.

EXAMPLE

The table below describes the performance impact of a single-pass furnace:

|  | Case: | | | |
|---|---|---|---|---|
|  | Base 1 | Example 1.1 | Base 2 | Example 2.1 |
|  | Feed: | | | |
|  | Ethane | Ethane | LVN | LVN |
| Fired Coil Length | 12.192 m | 9.144 m | 12.649 m | 9.144 m |
|  | (40.0 ft) | (30.0 ft) | (41.5 ft) | (30.0 ft) |
| Coil Eff. Diameter | 3.937 cm | 3.353 cm | 3.937 cm | 3.937 cm |
|  | (1.55 in) | (1.32 in) | (1.55 in) | (1.55 in) |
| Transition Length | 1.494 m | 0.884 m | 1.494 m | 0.884 m |
|  | (4.9 ft) | (2.9 ft) | (4.9 ft) | (2.9 ft) |
| Res. Time (fired) | 0.109 sec | 0.067 sec | 0.111 sec | 0.075 sec |
| Res. Time (trans.) | 0.008 sec | 0.005 sec | 0.007 sec | 0.005 sec |
| Total Res. Time. | 0.117 sec | 0.072 sec | 0.118 sec | 0.080 sec |
| Max. coke thickness | 0.635 cm | 0.254 cm | 0.635 cm | 0.381 cm |
|  | (0.25 in) | (0.10 in) | (0.25 in) | (0.15 in) |
| Maximum coil temperature (TMT) | 1071° C. | 1129° C. | 1068° C. | 1152° C. |
|  | (1960° F.) | (2065° F.) | (1955° F.) | (2105° F.) |
| Ethane Conversion | 71 % | 71% | — | — |
| Cracking Severity (C3=/C1 wt. ratio) | — | — | 1.05 | 1.05 |
| Ethylene Yield | 55.3 wt % | 56.0 wt % | 32.2 wt % | 32.8 wt % |

The first comparative column, "Base 1" of the table represents a typical short-residence-time ethane cracking furnace having a single-pass radiant tube design. Residence time in the reaction zone of the furnace is approximately (~) 0.1 second. The radiant coil is of the internally finned design, with a flow area equivalent to a circular tube of 3.937 cm (1.55 in) diameter. In each case, the exemplary furnace (e.g., Example 1.1. and Example 2.1) is evaluated at the same dilution steam ratio as the base furnace (e.g., Base 1 and Base 2).

The first exemplary column, "Example 1.1" of the table, illustrates the impact that the present techniques have on ethane furnace design and operation. Because the tube surface is inert to catalytic coke formation, it is no longer necessary to design with the capability to operate with 0.635 cm (0.25 in) of coke in the coil. In the case shown, allowance is still provided for up to 0.254 cm (0.10 in) of coke, because coke is still produced by non-catalytic routes. With this reduced coke yield, the coil diameter can be reduced without generating excessive pressure drop. Because the tube surface is inert to catalytic coke formation, the designer is generally concerned with end-of-run tube metal temperatures because the conventional guidelines on acceptable start-of-run tube metal temperatures (from a coking viewpoint) are no longer controlling, thus allowing the radiant coil to be shortened and the transition zone between the reaction coil and the quench exchangers to be reduced to the shortest distance physically practical. By using a material that does not catalyze coking from the tube surface, a higher metal temperature can be used, provided it is within the mechanical capabilities of the material selected. The net result is that the residence time in the reaction zone can be reduced from about 0.10 seconds to less than 0.08 seconds, with a corresponding increase in the predicted ethylene yield.

The second comparative column, "Base 2" of the table, represents a typical short-residence-time naphtha (LVN) cracking furnace. Residence in the reaction zone of the furnace is ~0.1 second. The radiant coil is of the internally finned design, with a flow area equivalent to a circular tube of 3.94 cm (1.55 in) diameter.

The second exemplary column, "Example 2.1" of the table, illustrates the impact the present techniques have on naphtha furnace design. Because surface catalyzed coke represents a smaller fraction of the total coke produced in a naphtha cracker (compared to an ethane cracker) the capability to operate with 0.15 in coke has been retained for the furnace designed with inert-to-surface-catalyzed-coking tube material. This utilizes the same tube diameter to be retained, and a slightly higher end-of-run tube metal temperature requirement for the furnace (1150° C. (2105° F.)).

Again, the ability to increase start-of-run tube metal temperatures permits the coil length and reaction residence-time to be reduced. With residence time reduced to 0.08 seconds, ethylene yield is increased from 32.2 wt % to 32.8 wt %. Alternatively, a steam cracking furnace according to the present techniques may operate at similar cracking severity and residence time to a base case coil employing existing materials, but may capture significant energy efficiency credits by operating at significantly reduced dilution steam ratios.

FIG. 1 provides a generalized illustration example of a heat exchange apparatus, namely a hydrocarbon steam cracking furnace utilizing a "U-shaped" radiant coil, and uses such apparatus illustration to illustrate the broader inventive concepts of the present techniques. FIG. 1 exhibits a hydrocarbon steam cracking furnace 100, having a radiant heating and cracking section 102 and a convection heating section 104. A radiant section inlet manifold 132 supplies a preheated hydrocarbon feed to an external inlet conduit 130, which may be referred to as a first inlet conduit or first conduit. The external inlet conduit 130 conveys the feed to the radiant section 102 through internal conduit 140, which may be referred to as a second conduit, furnace conduit or radiant conduit. Once the feed is thermally cracked into a cracked product, it exits the internal conduit 140 via external outlet conduit 131, which may be referred to as a first outlet conduit or first conduit. The cracked product is then cooled or quenched in a quench exchanger 134 and forwarded for further processing and separation (not shown). The inlet manifold 132 and external inlet conduit 130 are supported by support 108, while external outlet conduit 131 is supported by outlet support 109. Quench exchanger 134 is supported by quench exchanger support 135.

A joint or connection 150 is provided between external inlet conduit 130 and the internal conduit or radiant coil 140, while another joint or connection 151 is provided between external outlet conduit 131 and the internal conduit 140. The joints 150 and 151 are illustrated positioned as if the furnace 100 is at operating temperature whereby the joints are displaced via thermal expansion to a position intermediate the first wall 110 and the second wall 120. The first wall 110 includes the furnace casing or protective shell which, among other functions, serves to confine joint 150 leaks to stay within the interior cavity or radiant section 102, so that leaking material may be consumed or oxidized without risk of fire or unconfined release. The second wall 120 may be defined by an inner surface (e.g., the surface facing the interior cavity) of refractory material (or region). The second wall 120 may be a lining or may be merely an interior surface of a refractory material that fills at least a portion of the region between the fire box and the casing or first wall 110. A buffer or refractory zone 160 is formed by region between the first wall 110 and the second wall 120 or region formed from the inner surface of the first wall 110 to the inner surface of the second wall 120.

One aspect of the present techniques is that the conduits 130, 131 and 140 are designed and positioned such that when the interior cavity, (e.g., the radiant or cryogenic interior of the heat exchange apparatus) reaches an extreme temperature that may have adverse affects upon the integrity of the joint 150, 151, a buffer zone is created by the second wall 120 between the first wall 110 and second wall 120 that protects the joint 150, 151 from direct exposure to the extreme temperatures or conditions in the interior cavity. It is recognized that the interior wall (e.g., the second wall 120) does not have to be merely a planar or curved surface, although it may often be of such shape, but that the second wall 120 may include some offset or separate features of the interior surface that are designed to create or extend the buffer or refractory zone 160, to contain or confine the joint within such zone 160. Such features are hereby included herein as part of the interior or second wall 120 according to the present techniques, such that the shape of the interior wall is not limited to any particular shape or design, but instead encompasses any such deviations, extensions, pockets, etc., that include the joint therein when the apparatus is at operating temperature.

Continuing to refer to FIG. 1 as one simplified example of the present techniques, FIG. 1 illustrates in one aspect, a heat exchange apparatus 100 comprising: a) a body 106 comprising an interior cavity 102, the body 106 including: a first wall 110 and a second wall 120 defining at least a portion of the body 106 and the first wall positioned exterior with respect to the second wall 120 and the interior cavity 102, and the second wall 120 positioned exterior with respect to the interior cavity 102 and interior with respect to the first wall 110; b) an external conduit or coil 130, 131, which may refer to the external inlet coil 130 or the external outlet coil 131, for conveying a fluid (e.g., feedstock for the external inlet coil 130 and effluent from the cracking of a feedstock for external outlet coil 131) to and from the body 106); c) an internal conduit or coil 140, which may refer to a furnace coil, in fluid communication with the external conduit 130, 131, wherein the internal conduit 140 is positioned at least partially within the interior cavity 102 of the body 106; and d) a joint 150, 151, which may refer to the inlet joint 150 and the outlet joint 151, between the external inlet conduit 130 or the external outlet conduit 131 and the internal conduit 140, wherein the joint 150, 151 is positioned intermediate the first wall 110 and the second wall 120. The joint 150, 151 is positioned intermediate (between or within the planes or surfaces generally defining) the first wall 110 and the second wall 120 when the heat exchange apparatus 100 is operating, preferably when the apparatus is at normal or full operating temperature. Stated differently, when the apparatus has experienced thermal displacement, which may be the maximum thermal displacement based on the temperature and pressure for the operating conditions, of the first conduit (e.g., the external inlet conduit 130 or the external outlet conduit 131) and second conduit (e.g., the internal conduit 140) relative to the body, the joint 150 or 151 should then be positioned intermediate the first and second walls. Depending upon the heat exchange apparatus application, function, risk, or use, the joint 150 or 151 may or may not be positioned intermediate the first wall and the second wall when the apparatus is either not operating or is not up to or (down to) normal operating temperature. In another embodiment, the present techniques may include a heat exchange apparatus wherein the first conduit (e.g., the external inlet conduit 130 or the external outlet conduit 131) comprises austenitic stainless steel; and the second conduit (e.g., the internal conduit 140) comprises a metallic or ceramic material that does not catalyze formation of coke; wherein the joint 150, 151 is positioned intermediate the first wall 110 and the second wall 120 when the internal conduit is at a tube metal temperature of at least 700° C., or at least 900° C., or at least 1000° C., or at least 1020° C., or at least 1100° C.

Figure 2:
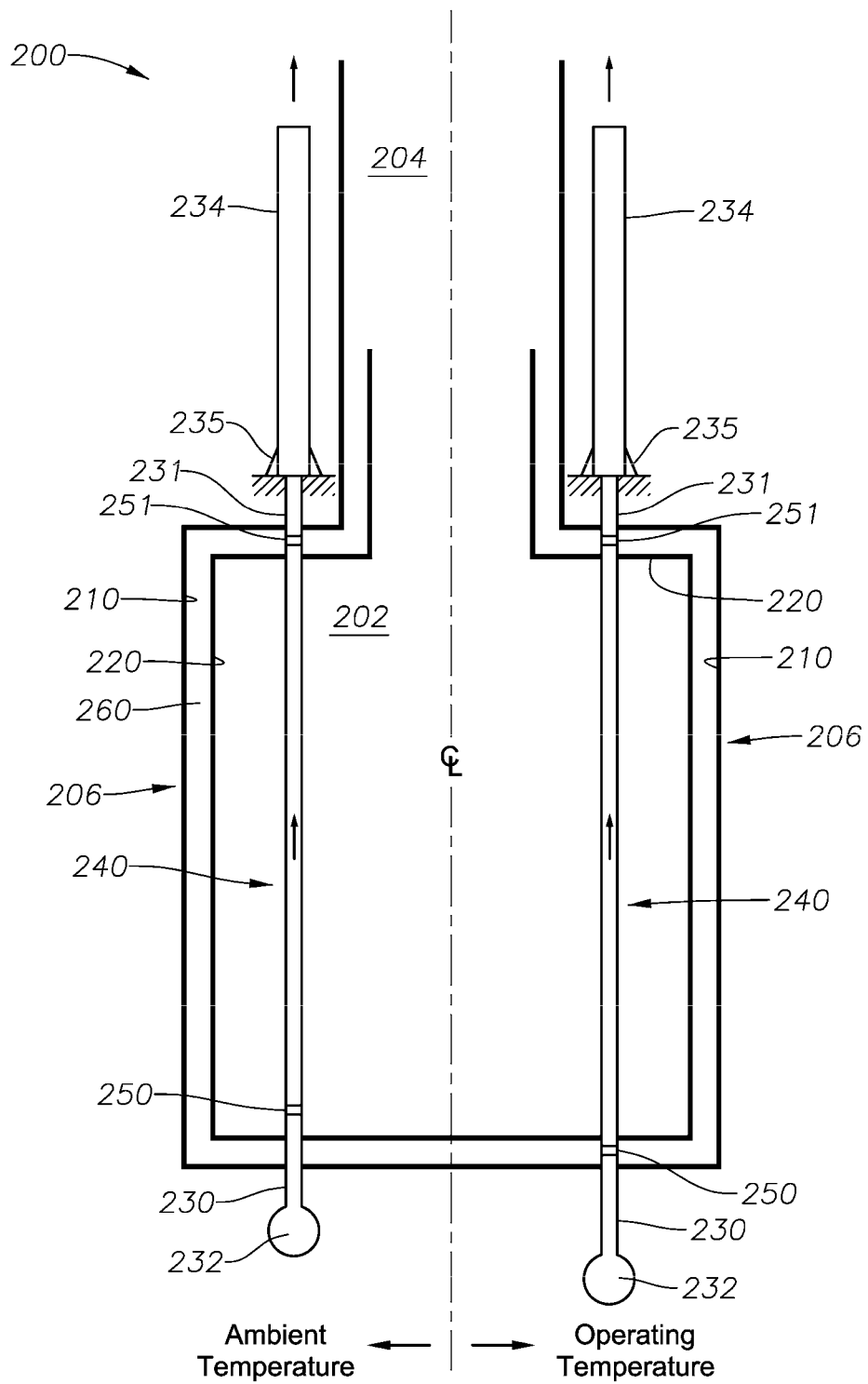
FIG. 2 illustrates simplified exemplary embodiments of a furnace employing a single-pass coil in accordance with the present techniques.

FIG. 2 provides a generalized illustration example of a heat exchange apparatus, namely a hydrocarbon steam cracking furnace utilizing a "single-pass" radiant tube or coil, and uses such apparatus illustration to illustrate the broader inventive concepts of the present techniques. FIG. 2 also differentiates from FIG. 1 in that the left half of FIG. 2 illustrates an embodiment at ambient conditions, whereby the joint 250 is located within interior cavity 202, and the right half of FIG. 2 illustrates essentially the embodiment at operating temperature with the joint 250 displaced to a position intermediate the first wall 210 and second wall 220. Ambient conditions may include temperatures between about −10° C. and 40° C. or preferably about 20° C., and pressures may be at atmospheric or higher. FIG. 2 exhibits a hydrocarbon steam cracking furnace 200, having a radiant heating and cracking section 202 and a convection heating section 204. A radiant section inlet manifold 232 supplies a preheated hydrocarbon feed to an external inlet conduit 230, which may be referred to as a first inlet conduit or first conduit. The external inlet conduit 230 conveys the feed into the interior cavity radiant section 202 through internal conduit 240, which may be referred to as a second conduit, furnace conduit or radiant conduit. Once the feed is thermally cracked into a steam cracker product, it exits the internal conduit 240 via external outlet conduit 231. The cracked product is then cooled or quenched in a quench exchanger 234 and forwarded for further processing and separation (not shown). The weight of the internal conduit 240 and the external outlet conduit 231 are supported by the coil support 235. However, the weight of the inlet manifold 232 and the external inlet conduit 230 are supported by counter-weights connected to the inlet manifold 232. This arrangement may reduce tensile stress from the weight of the manifold in the internal conduit 240, which may result in a reduction in excessive creep rates in the conduit material.

Inlet joint or connection 250 is provided between external inlet conduit 230 and the internal conduit 240, while an outlet joint or connection 251 is provided between external outlet conduit 231 and internal conduit 240. The joints 250 and 251 in the right-hand half of FIG. 2 are illustrated positioned as if the furnace 200 is at operating temperature, whereby the joints 250 and 251 are displaced via thermal expansion to a position intermediate the first wall 210 and the second wall 220. The first wall 210 includes the furnace casing or protective shell which, among other functions, serves to confine any joint 250 leaks within the interior cavity or radiant section 202, so that any leaking material may be consumed or oxidized without risk of fire or unconfined release. The second wall 220 is defined by an inner surface (e.g., the surface facing the interior cavity) of the refractory material (or region) 260.

Continuing to refer to FIG. 2 as one simplified example of the present techniques, FIG. 2 illustrates in one aspect, a heat exchange apparatus 200 comprising: a) a body 206 comprising an interior cavity 202, the body 206 including: a first wall 210 and a second wall 220 defining at least a portion of the body 206 and the first wall positioned exterior with respect to the second wall 220 and the interior cavity 202, and the second wall 220 positioned exterior with respect to the interior cavity 202 and interior with respect to the first wall 210; b) an external conduit, which may refer to the external inlet coil 230 or the external outlet coil 231 for conveying a fluid (e.g., feedstock for the external inlet coil 230 and effluent from the cracking of a feedstock for external outlet coil 231) to or from the body 106; c) the internal conduit 240 in fluid communication with the external inlet conduit 230 and the external outlet conduit 231 wherein the internal conduit 240 is positioned at least partially within the interior cavity 202 of the body 206; and d) a joint 250, 251, which may refer to the inlet joint 250 and the outlet joint 251, between the external inlet conduit 230 or the external outlet conduit 231 and the internal conduit 240, wherein the joint 250, 251 is positioned intermediate the first wall 210 and the second wall 220. The joint 250, 251 is positioned intermediate (between or within the planes or surfaces generally defining) the first wall 210 and the second wall 220 when the heat exchange apparatus 200 is operating, preferably when the apparatus is at normal or full operating temperature. Stated differently, when the apparatus has experienced thermal displacement, which may be the maximum thermal displacement based on the temperature and pressure for the operating conditions, of the first conduit (e.g., the external inlet conduit 230 or the external outlet conduit 231) and second conduit (e.g., the internal conduit 240) relative to the body, the joint 250, 251 should then be positioned intermediate the first and second walls. Depending upon the heat exchange apparatus application, function, risk, or use, the joint 250, 251 may or may not be positioned intermediate the first wall and the second wall when the apparatus is either not operating or is not up to or (down to) normal operating temperature. In another embodiment, the present techniques may include a heat exchange apparatus wherein the external conduit 230, 231 comprises austenitic stainless steel; and the internal conduit 240 comprises a metallic or ceramic material that does not catalyze formation of coke; wherein the joint 250, 251 is positioned intermediate the first wall 210 and the second wall 220 when the internal conduit 240 is at a tube metal temperature of at least 700° C., or at least 900° C., or at least 1000° C., or at least 1020° C., or at least 1100° C.

The heat exchange apparatus may be substantially any heat exchange unit providing a fluid conveying (e.g., tubular) conduit within a body, (meaning a housing, case, shell, vessel, or casing that encloses, either partially or fully, an interior cavity (e.g., a firebox, fluid chamber, convection cell, furnace unit, pyrolysis unit, reactor unit, etc.). The interior cavity may provide a heat source, such as a furnace, burner, heated fluid or media, or firebox. In other embodiments, however, the interior cavity may provide a heat sink source, such as for a cryogenic process or cooling process whereby the fluid within the tubular components is cooled.

The tubular components convey a fluid, such as a gas, vapor, mist, liquid, or other fluid into or through the interior cavity wherein a heat exchange process happens between the conveyed fluid and the heat (or cold) source within the interior cavity, and typically then back out of the interior cavity for subsequent processing or recovery. The tubular fluid and cavity fluid do not intermingle within the interior cavity, but instead remain within their respective conduits or vessels. For example, in a steam cracker, the hydrocarbon feed flows from a convection pre-heating section through a crossover or radiant inlet tubing into the radiant section of the furnace or cracker. The hydrocarbon feed remains within the tubing as it is heated in and conveyed through the radiant cracking section, thereafter exiting the radiant section through exit or external outlet conduits. The external outlet conduit material may be similar to the external inlet conduit material, similar to the internal conduit material or may include a different material. According to the present techniques, the joint connecting the internal or radiant conduit with the external inlet conduit may be located between the furnace casing (first wall)

and interior surface (second wall) of the refractory lining inside of the furnace, while the furnace and tubing are at operating temperature. An operating temperature may be, for example, a tube metal temperature of the internal or radiant conduit of at least 700° C., at least 800° C., at least 900° C., at least 1000° C., at least 1020° C., at least 1050° C., at least 1100° C., at least 1150° C., or at least 1200° C.

While the embodiments above refer to a first wall and a second wall for the body of the heat exchanger, other embodiments may include a single body or combination of different two or more layers as part of the wall. Accordingly, it should be appreciated that the body includes a first surface and a second surface, which may as provided in the embodiments above, include a first wall and a second wall. Regardless, the joint between the conduits (e.g., one of the conduits providing the fluid flow path into and out of the body and the coil within the interior cavity) may be located intermediate the first surface and the second surface of the body at operating temperatures to protect the joint, as discussed above.

In other embodiments, the heat exchange apparatus may further comprise a refractory material (including the region or zone provided therein) intermediate the first wall and the second wall. The term "refractory material" is defined broadly herein to mean a zone containing materials and/or air that is substantially buffered or protected from the temperature extremes of the interior cavity, and includes substantially any material and/or region there-between that provides a thermal barrier, a heat sink, heat reflection, or an insulation function, including but not limited to materials such as insulation, refractory grade insulating materials, fire brick, tiles, panels, air space, fibrous material, a fluid chamber, and/or other interior lining for the outer wall or shell. The term "refractory material" as used herein also refers not only to the actual materials used, but also includes the entire zone or region between and including the interior (second) wall and the exterior (first) wall. Thereby, the refractory material zone may isolate, reduce, contain, buffer, and/or insulate the joint or connection between the conduits from intense heat or cold within the interior cavity, when the apparatus or method is at a particular temperature, such as at least 700° C., or at least 900° C., or at least 1000° C., or at least 1020° C., at least 1100° C., or at least 1200° C., such temperatures, and including all temperatures within the spectrum of such values. The temperatures are a measure of the coil, conduit, or tube temperature, known generally as the tube metal temperature. A refractory or other material also may be provided for the outer surface of the tubular components and joint connection as it is positioned between the first wall (casing) and surface where the liner (second wall) forms the interior cavity. One function of the second wall is to isolate, insulate, or partially shield the tubular joint from exposure to the intense heat or cold within the interior cavity (e.g., radiant flame heat, etc.). It may also be a function of the refractory lining to isolate, insulate, or partially shield the tubular joint from exposure to the intense heat or cold within the interior cavity (e.g., radiant flame heat, etc.), either separately, exclusively, or supplementary, with respect to the second wall.

In some embodiments, the internal conduit comprises at least one of an alumina former, a ceramic, and combinations thereof. In still other embodiments, the joint includes fusing (e.g., by thermal means, including but not limited to braze, weld, TIG weld, MIG weld, etc.) between the external conduit and the internal conduit. Other joining mechanisms, such as clamps, threads, and/or flanges, may also be used, alone or in combination with such fusing.

In some embodiments, the joint is not intermediate (between) the first wall and the second wall when the internal conduit is at a tube metal temperature of 20° C. (ambient or at a temperature relatively different from operating temperature). This repositioning of the joint from its position intermediate the first and second walls when at operating temperature, is due primarily to thermal contraction or expansion of the tubes.

In other embodiments, the internal conduit comprises an oxide layer on an inner surface of the internal conduit, wherein the oxide layer comprises not more than or less than 1 wt % of nickel, iron, or mixtures thereof, based upon the total weight of the oxide layer on the inner surface of the internal conduit. The oxide layer may contain more than 1 wt % of some of these elements. The preferred functional aspect is that the surface oxide layer formed under the operating conditions of steam cracking is free of iron oxides and nickel-oxides. The phrase "not more than 1 wt %" or the phrase "less than 1 wt %" means that the maximum amount of nickel, iron, or mixtures thereof present is 1.0 wt %, but many desired embodiments may have less than 1 wt %, such as substantially no nickel, iron or mixtures thereof, or less than 0.1 wt % or less than 0.01 wt %, or less than 0.001 wt %. Still, other embodiments may include a heat exchange apparatus wherein the internal conduit metallic material comprises an oxide layer on an inner surface of the internal conduit, wherein the oxide layer comprises less than 1 wt % of nickel, iron, or mixtures thereof. Many embodiments have substantially no nickel, iron, or mixtures thereof.

In other embodiments, the inner surface of the internal conduit comprises at least one of aluminum oxide, silicone oxide, zirconium oxide, yttrium oxide, and cesium oxide.

In still other embodiments, the heat exchange apparatus, when the internal conduit is at a tube metal temperature of at least 1100° C. the joint is intermediate the first wall and the second wall.

In other aspects, the present techniques include a hydrocarbon cracking unit comprising: a) a furnace including a furnace casing exterior with respect to a firebox wall and a firebox, the firebox wall exterior to the firebox and interior with respect to the furnace casing; b) a first conduit (e.g., an external conduit) comprising austenitic stainless steel; c) a second conduit (e.g., an internal conduit) comprising an inner surface that does not catalyze formation of coke, the second conduit positioned at least partially within the firebox; and d) a joint between the first conduit and the second conduit, wherein the joint is intermediate the furnace casing and the firebox wall when the second conduit is at a tube metal temperature of at least 1020° C.

In other embodiments, the cracking unit includes a radiant heat source within the radiant section. In many embodiments, the tubing or conduit within the radiant section is at operating temperature when it has a tube metal temperature of at least 700° C., or often at least 1000° C., or at least 1020° C., or at least 1100° C. In yet other embodiments, the hydrocarbon feedstock is mixed with steam before entering the interior cavity (radiant section, etc.) of the body. Other cracking unit embodiments may include a convection section in thermal communication with the firebox. In yet other embodiments, the cracking unit may include a feed for cracking, the feed including a mixture of hydrocarbon and steam.

In still other embodiments, the cracking unit may further comprise a refractory material intermediate the first wall and the second wall.

In some embodiments of the cracking unit, the second or internal conduit has an internal diameter that provides a firebox residence time of less than 0.20 seconds, preferably less than 0.15 seconds, more preferably less than 0.11 seconds, still more preferably less than 0.10 seconds, and still more preferably less than 0.08 seconds.

In some other embodiments, the second or internal conduit comprises at least one of an alumina former, a ceramic, and combinations thereof.

Some embodiments may include a weld between the first or external conduit and the second or internal conduit.

In other embodiments of the cracking unit, the joint is not intermediate the furnace casing and the firebox wall when the second or internal conduit is at a tube metal temperature of 20° C.

In still other embodiments of a cracking unit, the second or internal conduit may comprise an oxide layer on an inner surface of the second or internal conduit, wherein the oxide layer comprises less than 5 wt % of nickel, iron, or mixtures thereof, preferably less than 2 wt % of nickel, iron, or mixtures thereof, 1 wt % of nickel, iron, or mixtures thereof. Further, in one or more embodiments, the oxide layer comprises less than 2 wt % of iron, and less than 1 wt % of nickel. In other embodiments, the inner surface of the second or internal conduit comprises at least one of aluminum oxide, silicon oxide, zirconium oxide, yttrium oxide, and cesium oxide.

In various other embodiments of the cracking unit, the second or internal conduit is at a tube metal temperature of at least 1100° C. when the joint is intermediate the furnace casing and the interior cavity or firebox wall.

According to other cracking unit embodiments, the second or internal conduit comprises at least one of single pass coil, a U-shaped coil, a serpentine coil, and a multiple pass coil. In yet other embodiments, the second or internal conduit comprises a non-circular internal profile, such as an internally finned tube profile.

In still other aspects, an embodiment of the present techniques may include a method for preparing a heat exchange unit comprising: a) providing a body comprising an interior cavity within the body, the body further comprising a first wall and a second wall, the second wall defining the interior cavity within the body, the first wall positioned exterior with respect to the second wall and the interior cavity, and the second wall positioned exterior with respect to the interior cavity and interior with respect to the first wall; b) providing a first or external conduit, at least a portion of the first or external conduit being exterior with respect to the first wall; c) providing a second or internal conduit, positioning the second or internal conduit in fluid communication with the first or external conduit, and the second or internal conduit positioned at least partially within the interior cavity of the body; and d) positioning a joint between the first conduit and the second conduit intermediate the first wall and the second wall when the second conduit is at a tube metal temperature of at least 700° C.

In other embodiments of the method, the heat exchange unit is a steam cracking furnace. In still other embodiments, the first or external conduit comprises austenitic stainless steel and the second or internal conduit comprises a metallic or ceramic interior surface that does not catalyze formation of coke.

In another aspect, an embodiment of the present techniques include a method for cracking hydrocarbon in a steam cracking unit comprising: a) providing a steam cracking furnace body comprising an interior cavity within the body, the body further comprising a first wall and a second wall, the second wall defining the interior cavity within the body, the first wall positioned exterior with respect to the second wall and the interior cavity, and the second wall positioned exterior with respect to the interior cavity and interior with respect to the first wall; b) providing a first or external conduit comprising austenitic stainless steel, at least a portion of the first conduit being exterior with respect to the first wall; c) providing a second or internal conduit comprising a metallic or ceramic material that does not catalyze formation of coke, positioning the second conduit in fluid communication with the first conduit, and the second conduit positioned at least partially within the interior cavity of the body; d) positioning a joint between the first conduit and the second conduit intermediate the first wall and the second wall; e) heating the second conduit to a tube metal temperature of at least 700° C., or in some embodiments at least 900° C., or at least 1000° C., or at least 1020° C.; or at least 1100° C.; and f) feeding a hydrocarbon feedstock along a fluid path through the first conduit, through the joint, and through the second conduit.

In other embodiments, the method may further comprise feeding a mixture of hydrocarbon and steam through the second conduit at a rate sufficient to provide a cracking residence time of less than 0.2 seconds.

In yet other embodiments, the method may comprise welding the first conduit with the second conduit at the joint.

In another embodiment, the present techniques relate to:

1. A heat exchange apparatus comprising:
   a) a body forming an interior cavity, said body including:
      a first surface and a second surface defining at least a portion of said body, wherein said first surface is positioned exterior with respect interior cavity and with respect to said second surface, and said second surface positioned between said interior cavity and said first surface;
   b) a first conduit for conveying a fluid to said body;
   c) a second conduit in fluid communication with said first conduit wherein said second conduit is positioned at least partially within said interior cavity of said body; and
   d) a joint between said first conduit and said second conduit, wherein said joint moves between a first location and a second location based on the temperature within the interior cavity, wherein at least one of the first location and the second location is intermediate said first surface and said second surface.

2. The heat exchange apparatus of paragraph 1, wherein:
   said first conduit comprises austenitic stainless steel; and
   said second conduit comprises a metallic or ceramic material that does not catalyze formation of coke;
   wherein said joint is positioned intermediate said first wall and said second wall when said second conduit is at a tube metal temperature of at least 1100° C.

3. The heat exchange apparatus of paragraph 1 or 2, further comprising a refractory material intermediate said first wall and said second wall.

4. The heat exchange apparatus of any of paragraphs 1 to 3, wherein said second conduit is formed from a material comprising at least one of an alumina former, a ceramic, and combinations thereof.

5. The heat exchange apparatus of any of paragraphs 1 to 4, wherein said joint includes a weld between said first conduit and said second conduit.

6. The heat exchange apparatus of any of paragraphs 1 to 5, wherein said joint is within said interior cavity of said body when said second conduit is at a tube metal temperature of 20° C.

7. The heat exchange apparatus of any of paragraphs 1 to 6, wherein said second conduit comprises an oxide layer on an inner surface of said second conduit, wherein said oxide layer comprises less than 1 wt % of nickel, iron, or mixtures thereof.

8. The heat exchange apparatus of any of paragraphs 1 to 7, wherein said second conduit metallic material comprises an oxide layer on an inner surface of said second conduit, wherein said oxide layer comprises less than 1 wt % of nickel, iron, or mixtures thereof.

9. The heat exchange apparatus of any of paragraphs 1 to 8, wherein said inner surface of said second conduit comprises at least one of aluminum oxide, silicon oxide, zirconium oxide, yttrium oxide, chromium oxide, and cesium oxide.

10. The heat exchange apparatus of any of paragraphs 1 to 9, wherein when said second conduit is at a tube metal temperature of at least 700° C., said joint is intermediate said first wall and said second wall.

11. The heat exchanger apparatus of any of paragraphs 1 to 10, wherein said position of said joint location is configured to move based on thermal changes between (i) a first position intermediate said first wall and said second wall and (ii) a second position within said interior cavity of said body.

12. A hydrocarbon cracking unit comprising:
a) a furnace having an interior cavity formed by a furnace casing and firebox wall, wherein said furnace casing is exterior with respect to said interior cavity, said firebox wall positioned between said furnace casing and interior cavity;
b) a first conduit comprising austenitic stainless steel;
c) a second conduit comprising an inner surface, said second conduit positioned at least partially within said interior cavity; and
d) a joint between said first conduit and said second conduit, wherein said joint moves between a first location and a second location based on the temperature within the interior cavity, wherein at least one of said first location and said second location is intermediate said furnace casing and said firebox wall.

13. The cracking unit of paragraph 12, further comprising a radiant heat source within said interior cavity and said tube metal temperature of said second conduit is at least 1000° C. when said joint is intermediate said furnace casing and said firebox wall.

14. The cracking unit of any of paragraphs 12 to 13, wherein said second conduit comprises a radiant tube for cracking a hydrocarbon feedstock mixed with steam.

15. The cracking unit of any of paragraphs 12 to 14, further comprising a convection section in thermal communication with said first conduit.

16. The cracking unit of any of paragraphs 12 to 15, further comprising a refractory material intermediate said furnace casing and said firebox wall.

17. The cracking unit of any of paragraphs 12 to 16, wherein said second conduit has an internal diameter that provides a furnace residence time of less than 0.20 seconds.

18. The cracking unit of any of paragraphs 12 to 17, wherein said second conduit is made of a material comprising at least one of an alumina former, a ceramic, and combinations thereof.

19. The cracking unit of any of paragraphs 12 to 18, wherein said joint includes a weld between said first conduit and said second conduit.

20. The cracking unit of any of paragraphs 12 to 19, wherein said joint is within said interior cavity of said furnace when said second conduit is at a tube metal temperature of 20° C.

21. The cracking unit any of paragraphs 12 to 20, wherein said second conduit comprises an oxide layer on an inner surface of said second conduit, wherein said oxide layer comprises less than 1 wt % of nickel, iron, or mixtures thereof.

22. The cracking unit of paragraph 21, wherein said inner surface of said second conduit comprises at least one of aluminum oxide, silicone oxide, zirconium oxide, yttrium oxide, chromium oxide, and cesium oxide.

23. The cracking unit of any of paragraphs 12 to 22, wherein when said second conduit is at a tube metal temperature of at least 700° C. when said joint is intermediate said furnace casing and said firebox wall.

24. The cracking unit of any of paragraphs 12 to 19 and 21 to 23, wherein said second conduit comprises at least one of a single pass coil, a U-shaped coil, a serpentine coil, and a multiple pass coil.

25. The cracking unit of any of paragraphs 12 to 24, wherein said second conduit comprises a non-circular internal profile.

26. The cracking unit of any of paragraphs 12 to 23 and 25, wherein said position of said joint location is configured to move based on thermal changes between (i) a first position intermediate said furnace casing and firebox wall and (ii) a second position within said interior cavity of said furnace.

27. A method for preparing a heat exchange unit (preferably the unit or apparatus of any of paragraphs 1 to 26) comprising:
a) providing a body having an interior cavity within said body, said body further comprising a first surface and a second surface, said second surface defining said interior cavity within said body, said first surface positioned exterior with respect to said second surface and with respect to said interior cavity, and said second surface positioned between said interior cavity and said first surface;
b) providing a first conduit, at least a portion of said first conduit being exterior with respect to said first surface;
c) providing a second conduit, positioning said second conduit in fluid communication with said first conduit, and said second conduit positioned at least partially within said interior cavity of said body; and
d) positioning a joint between said first conduit and said second conduit and said joint moves between a first location and a second location based on the temperature within the interior cavity, wherein at least one of said first location and said second location being between (i) intermediate said first surface and said second surface and (ii) within said interior cavity of said body, wherein said location is at least partially dependent on the temperature within said interior cavity.

28. The method of paragraph 27, wherein said heat exchange unit is a steam cracking furnace.

29. The method of paragraph 27 or 28, wherein said first conduit comprises austenitic stainless steel and said second conduit comprises a metallic or ceramic interior surface that does not catalyze formation of coke.

30. The method any of paragraphs 27 to 29, wherein said joint between said first conduit and said second conduit is intermediate said first wall and said second wall when said second conduit is at a tube metal temperature of at least 700° C.

31. A method for cracking hydrocarbon in a steam cracking unit (preferably the unit or apparatus of any of paragraphs 1 to 26) comprising:
a) providing a steam cracking furnace body comprising an interior cavity within said body, said body further comprising a first surface and a second surface, said second surface defining said interior cavity within said body, said first surface positioned exterior with respect to said second surface and with respect to said interior cavity, and said second surface positioned between said interior cavity and said first surface;

b) providing a first conduit comprising austenitic stainless steel, at least a portion of said first conduit being exterior with respect to said first surface;
c) providing a second conduit comprising a metallic or ceramic material that does not catalyze formation of coke, positioning said second conduit in fluid communication with said first conduit, and said second conduit positioned at least partially within said interior cavity of said body;
d) positioning a joint between said first conduit and said second conduit at one of a first location or a second location, wherein at least one of said first location and second location is intermediate said first surface and said second surface, wherein said first location and said second location is at least partially dependent on the temperature within said interior cavity;
e) heating said second conduit to a tube metal temperature of at least 700° C.; and
f) feeding a hydrocarbon feedstock along a fluid path through said first conduit, through said joint, and through said second conduit.

32. The method of paragraph 31, further comprising feeding a mixture of hydrocarbon and steam through said second conduit at a rate sufficient to provide a cracking residence time of less than 0.2 seconds.

33. The method of paragraph 31 or 32, comprising fusing said first conduit with said second conduit at said joint.

While the present techniques have been described and illustrated with respect to certain embodiments, it is to be understood that the present techniques are not limited to the particulars disclosed and extends to all equivalents within the scope of the claims.

We claim:
1. A heat exchange apparatus comprising:
a) a furnace body forming an interior cavity, said furnace body including:
a first surface and a second surface defining at least a portion of said furnace body, wherein said first surface is positioned exterior with respect to said interior cavity and with respect to said second surface, and said second surface is positioned between said interior cavity and said first surface;
b) a first conduit for conveying a fluid to said furnace body;
c) a second conduit in fluid communication with said first conduit wherein said second conduit is positioned at least partially within said interior cavity of said furnace body; and
d) a joint between said first conduit and said second conduit, wherein (i) said joint moves between a first location and a second location based on the temperature within the interior cavity, (ii) the first location is intermediate said first surface and said second surface, and (iii) said second location is within said interior cavity of said furnace body.

2. The heat exchange apparatus of claim 1, wherein the first surface is a first wall and the second surface is a second wall, and further comprising a refractory material intermediate said first wall and said second wall.

3. The heat exchange apparatus of claim 1, wherein said second conduit is formed from a material comprising at least one of an alumina former, a ceramic, and combinations thereof.

4. The heat exchange apparatus of claim 1, wherein said joint includes a weld between said first conduit and said second conduit.

5. The heat exchange apparatus of claim 1, wherein said second conduit comprises an oxide layer on an inner surface of said second conduit, wherein said oxide layer comprises less than 5 wt % of nickel, iron, or mixtures thereof.

6. The heat exchange apparatus of claim 1, wherein said second conduit comprises a metallic material comprising an oxide layer on an inner surface of said second conduit, wherein said oxide layer comprises less than 1 wt % of nickel and said oxide layer comprises less than 2 wt % of iron.

7. The heat exchange apparatus of claim 6, wherein said inner surface of said second conduit comprises at least one of aluminum oxide, silicon oxide, zirconium oxide, yttrium oxide, and cesium oxide.

8. The heat exchange apparatus of claim 1, wherein when said second conduit is at a tube metal temperature of at least 700° C., said joint is intermediate said first surface and said second surface.

9. A hydrocarbon cracking unit comprising:
a) a furnace having an interior cavity formed by a furnace casing and firebox wall, wherein said furnace casing is exterior with respect to said interior cavity, said firebox wall is positioned between said furnace casing and interior cavity;
b) a first conduit for conveying fluid to furnace, said first conduit comprising austenitic stainless steel;
c) a second conduit in fluid communication with said first conduit, said second conduit comprising an inner surface, and said second conduit being positioned at least partially within said interior cavity; and
d) a joint between said first conduit and said second conduit, wherein (i) said joint moves between a first location and a second location based on the temperature within the interior cavity, (ii) said first location is intermediate said furnace casing and said firebox wall, and (iii) said second location is within said interior cavity.

10. The cracking unit of claim 9, further comprising a radiant heat source within said interior cavity, and said tube metal temperature of said second conduit is at least 1000° C. when said joint is intermediate said furnace casing and said firebox wall.

11. The cracking unit of claim 9, wherein said second conduit comprises a radiant tube for cracking a hydrocarbon feedstock mixed with steam.

12. The cracking unit of claim 9, further comprising a convection section in thermal communication with said first conduit.

13. The cracking unit of claim 9, further comprising a refractory material intermediate said furnace casing and said firebox wall.

14. The cracking unit of claim 9, wherein said second conduit has an internal diameter that provides a furnace residence time of less than 0.20 seconds.

15. The cracking unit of claim 9, wherein said second conduit is made of a material comprising at least one of an alumina former, a ceramic, and combinations thereof.

16. The cracking unit of claim 9, wherein said joint includes a weld between said first conduit and said second conduit.

17. The cracking unit of claim 16, wherein said joint is within said interior cavity of said furnace when said second conduit is at a tube metal temperature of 20° C.

18. The cracking unit of claim 16, wherein said second conduit comprises an oxide layer on an inner surface of said second conduit, wherein said oxide layer comprises less than 5 wt % of nickel, iron, or mixtures thereof.

19. The cracking unit of claim 18, wherein said inner surface of said second conduit comprises at least one of aluminum oxide, silicon oxide, zirconium oxide, yttrium oxide, and cesium oxide.

20. The cracking unit of claim 9, wherein when said second conduit is at a tube metal temperature of at least 1100° C. when said joint is intermediate said furnace casing and said firebox wall.

21. The cracking unit of claim 9, wherein said second conduit comprises at least one of a single pass coil, a U-shaped coil, a serpentine coil, and a multiple pass coil.

22. The cracking unit of claim 9, wherein said second conduit comprises a non-circular internal profile.

23. A heat exchange apparatus comprising:
a) a furnace body forming an interior cavity, said furnace body including:
   a first surface and a second surface defining at least a portion of said furnace body, wherein said first surface is positioned exterior with respect to said interior cavity and with respect to said second surface, and said second surface is positioned between said interior cavity and said first surface;
b) a first conduit for conveying a fluid to said furnace body, wherein said first conduit comprises austenitic stainless steel;
c) a second conduit in fluid communication with said first conduit wherein (i) said second conduit is positioned at least partially within said interior cavity of said furnace body and (ii) said second conduit comprises a metallic or ceramic material that does not catalyze formation of coke; and
d) a joint between said first conduit and said second conduit, wherein (i) said joint moves between a first location and a second location based on the temperature within the interior cavity, (ii) at least one of the first location and the second location is intermediate said first surface and said second surface, and (iii) said joint is positioned intermediate said first surface and said second surface when said second conduit is at a tube metal temperature of at least 1100° C.

24. A heat exchange apparatus comprising:
a) a furnace body forming an interior cavity, said furnace body including:
   a first surface and a second surface defining at least a portion of said furnace body, wherein said first surface is positioned exterior with respect to said interior cavity and with respect to said second surface, and said second surface is positioned between said interior cavity and said first surface;
b) a first conduit for conveying a fluid to said furnace body;
c) a second conduit in fluid communication with said first conduit wherein said second conduit is positioned at least partially within said interior cavity of said furnace body; and
d) a joint between said first conduit and said second conduit, wherein (i) said joint moves between a first location and a second location based on the temperature within the interior cavity, (ii) at least one of the first location and the second location is intermediate said first surface and said second surface, and (iii) said joint is within said interior cavity of said furnace body when said second conduit is at a tube metal temperature of 20° C.

* * * * *